(12) United States Patent
Falter et al.

(10) Patent No.: US 8,022,645 B2
(45) Date of Patent: Sep. 20, 2011

(54) CIRCUIT CONFIGURATION WITH AN END STAGE FOR SWITCHING AN INDUCTIVE LOAD

(75) Inventors: Johann Falter, Wenzenbach (DE); Franz Laberer, Regensburg (DE)

(73) Assignee: Continental Automotive GmbH, Hanover (DE)

( * ) Notice: Subject to any disclaimer, the term of this patent is extended or adjusted under 35 U.S.C. 154(b) by 365 days.

(21) Appl. No.: 12/234,893

(22) Filed: Sep. 22, 2008

(65) Prior Publication Data

US 2009/0079490 A1    Mar. 26, 2009

(30) Foreign Application Priority Data

Sep. 20, 2007   (DE) .................... 10 2007 044 927

(51) Int. Cl.
*H02P 1/00*    (2006.01)
(52) U.S. Cl. ........ 318/139; 318/495; 318/496; 318/497; 318/498; 318/499
(58) Field of Classification Search ............ 318/139, 318/495–499
See application file for complete search history.

(56) References Cited

U.S. PATENT DOCUMENTS

| | | | | |
|---|---|---|---|---|
| 5,332,954 A * | 7/1994 | Lankin | | 318/139 |
| 5,530,788 A * | 6/1996 | Saijima | | 388/811 |
| 6,084,378 A * | 7/2000 | Carobolante | | 318/811 |
| 6,291,954 B1 * | 9/2001 | Joch et al. | | 318/434 |
| 6,332,506 B1 * | 12/2001 | Kifuku | | 180/443 |
| 6,462,506 B2 * | 10/2002 | Cochoy et al. | | 318/801 |
| 6,646,407 B2 * | 11/2003 | Rahman et al. | | 318/701 |
| 6,686,719 B2 * | 2/2004 | Cochoy et al. | | 318/801 |
| 7,236,041 B2 * | 6/2007 | Kim et al. | | 327/434 |

* cited by examiner

*Primary Examiner* — Walter Benson
*Assistant Examiner* — David S Luo
(74) *Attorney, Agent, or Firm* — Laurence A. Greenberg; Werner H. Stemer; Ralph E. Locher

(57) ABSTRACT

A circuit configuration includes an output stage having at least one inductive load and a switching transistor configuration for switching the at least one inductive load. A supply voltage has a first supply potential and a second supply potential for feeding the supply voltage to the output stage. A registering device registers a particular instance when a potential at a specific circuit node of the output stage is outside a potential range defined by the first and second supply potentials.

6 Claims, 3 Drawing Sheets

CIRCUIT CONFIGURATION WITH AN END STAGE FOR SWITCHING AN INDUCTIVE LOAD

BACKGROUND OF THE INVENTION

Field of the Invention

The invention relates to a circuit arrangement that includes an output stage for switching at least one inductive load by means of a switching transistor arrangement, with the output stage being fed with a supply voltage defined by a first supply potential and a second supply potential.

Circuit arrangements of said type are known per se and can be used for instance in the automotive electronics sector for controlling electric direct-current motors or for controlling exciter windings of a magnetic actuator (in a solenoid valve, for example). In the automotive electronics sector the two supply potentials can be, for example, the terminal potentials of a vehicle battery or the output potentials of a DC/DC converter of the on-board vehicle electronics system.

Particularly in more complex circuit arrangements containing an output stage of the above-cited kind, such as in a control device for an internal combustion engine of a motor vehicle (for example for fuel injection control), faults can occur during operation in the case of which it is not fully clear what specific factor or which of a plurality of possible factors has caused the fault.

BRIEF SUMMARY OF THE INVENTION

Against that background it is an object of the present invention to improve a circuit arrangement of the type cited in the introduction in terms of the possibilities for fault diagnosing.

Said object is inventively achieved through the circuit arrangement's further having a registering device for registering the particular instance in which the potential at a specific circuit node of the output stage lies outside the potential range defined by the two supply potentials.

It has been shown that information of value to fault diagnosing can in numerous applications be obtained by means of potential registering of said type at one or more circuit nodes.

The particular instance in which the potential prevailing at a specific circuit node of the output stage lies outside the potential range defined by the two supply potentials can, depending on the specific circuitry concept, occur even under normal operating conditions, or it can indicate faulty operating conditions. It must in this context be considered that particularly upon an inductive load's deactivation the decay associated therewith in magnetic energy stored in the load can frequently (depending on the specific circuitry concept) result at least at one of the load's terminals in a potential that lies outside the supply potential range (that effect can be employed selectively in the case of, for example, DC-DC up converters for producing from a supply voltage an output voltage greater than it).

The inventive creation of a fault diagnosing possibility by means of the above-mentioned potential registering can be applied advantageously both to circuit arrangements where the circuit node potential can at times lie outside the supply potential range even during normal operation and to circuit arrangements where that occurs only in the event of a fault. Fault diagnosing can be enabled and/or improved for circuit arrangements of both kinds by the potential registering provided according to the invention.

It is provided in a preferred embodiment variant for registering to be limited to the particular instance in which the relevant potential lies outside the potential range by a predefined minimum extent. That measure takes account of the frequent situation that only a circuit node potential lying outside the potential range by a predefined minimum extent can have a significant impact on the functioning of other circuitry parts (also outside the output stage) and/or can as such constitute a fault instance in the output stage.

A development of said embodiment variant is for the minimum extent to correspond at least approximately to a diode voltage due to the fabrication technology of the switching transistor arrangement. Said development is based on the knowledge that, firstly, no microelectronically realized transistor possesses "ideal transistor properties" but rather has moreover per se undesired ("parasitic") properties and, secondly, that said parasitic properties often do not develop a substantial effect until a potential at a circuit node connected to the transistor lies at least by one "diode voltage" (forward voltage at a in junction) outside the supply potential range. Cited only by way of example as parasitic properties or elements in the case of a field-effect transistor are a "source-drain diode" and diodes between the drain or source and the substrate of the relevant transistor. Depending on the specific fabrication technology employed, even a plurality of further "Parasitic transistors" can frequently be marked up in a realistic equivalent circuit diagram of a transistor. That is connected with the fact that with modern fabrication technologies there are often a multiplicity of semiconductor regions doped to different extents or a multiplicity of pn junctions in a single transistor.

DMOS ("double-doped" MOS) technology is here cited as an instance thereof. In a DMOS field-effect transistor for example the drain from a highly n-doped region can be embodied in a weakly n-doped trough, with a p-doped region being provided as a trough divider separating adjacent structures situated once more in an n-doped trough. Thus what is produced overall is an npn structure which can be regarded as a parasitic npn transistor that reaches into adjacent troughs with its collector and so can impair the function of the structure realized there. If the "actual" DMOS transistor is used as, for example, a low-side switch in an output stage and its drain is pulled below ground by at least one diode voltage (for example more than about 1 V), then a per se undesired current to the adjacent trough can be induced.

Against that background it is clear that registering a potential at a circuit node connected to the transistor will in practice often be of major significance whenever said potential lies outside the supply potential range by at least one diode voltage due to the fabrication technology or transistor topology.

It is provided in an embodiment variant for the switching transistor arrangement to include one or more transistors fabricated using DMOS technology. It is in the case specifically of that technology, one that is often particularly advantageous for embodying switching transistors for switching an inductive-load, that the above-explained problems arise to a particular extent under certain potential-related conditions.

It is provided in an embodiment variant for potential registering to be provided at a circuit node connected to a terminal of a switching transistor of the switching transistor arrangement (for example to the drain of a switching transistor). It can alternatively or additionally be provided for registering to be provided at a circuit node connected during operation to a terminal of the inductive load.

It is provided in an embodiment variant for the registering device to have a comparator for comparing the potential at the circuit node with one of the supply potentials. A comparison with the first supply potential and/or second supply potential can therein in each case be performed for the relevant circuit node(s).

The first and second supply potential can be, for instance, an electric ground and a supply potential that is positive (or negative) with respect thereto. That will be the case in, for example, a motor vehicle's conventional electric distribution systems where a negative vehicle battery terminal is applied to an electric ground in turn connected to a conducting vehicle body. It is, though, possible also for neither supply potential of the circuit arrangement to be referred to a potential of a conducting vehicle body. That is often the case with, for example, hybrid vehicles where both terminal potentials of a vehicle battery are electrically insulated from the vehicle body.

The circuit arrangement is in a preferred embodiment variant a control device for an internal combustion engine of a motor vehicle or forms a part of a control device of said type. The control device can in a conventional motor vehicle be provided for, for example, controlling magnetically actuatable fuel injection valves constituting the inductive loads to be driven by the output stage. In a hybrid vehicle the control device can alternatively or additionally be provided also for controlling an electric drive by means of the output stage.

It is provided in an embodiment variant for at least the output stage (and, where applicable, further parts of the circuit arrangement) to be embodied as an application-specific integrated circuit ("ASIC" or "power ASIC").

It is provided in an embodiment variant for the circuit arrangement further to have a diagnostic memory for storing the registering result. Said type of diagnostic memories per se are in widespread use in, for example, the automotive electronics sector. Within the scope of the invention the result of specific, inventive potential registering can advantageously be taken into account during fault diagnosing.

Potential registering as provided according to the invention can advantageously be combined with the registering of further particular events occurring during operation of the circuit arrangement. Cited in this regard only by way of example is the registering of "line breaks" and "short-circuits". Corresponding registering or diagnostic devices are known per se. A substantial improvement in the reliability or accuracy of fault registering or fault diagnosing can, though, often be achieved in combination with the potential registering as employed according to the invention.

BRIEF DESCRIPTION OF THE SEVERAL VIEWS OF THE DRAWING

The invention is further described below with the aid of exemplary embodiments and with reference to the attached drawings, in which.

DESCRIPTION OF THE INVENTION

Figure 1:
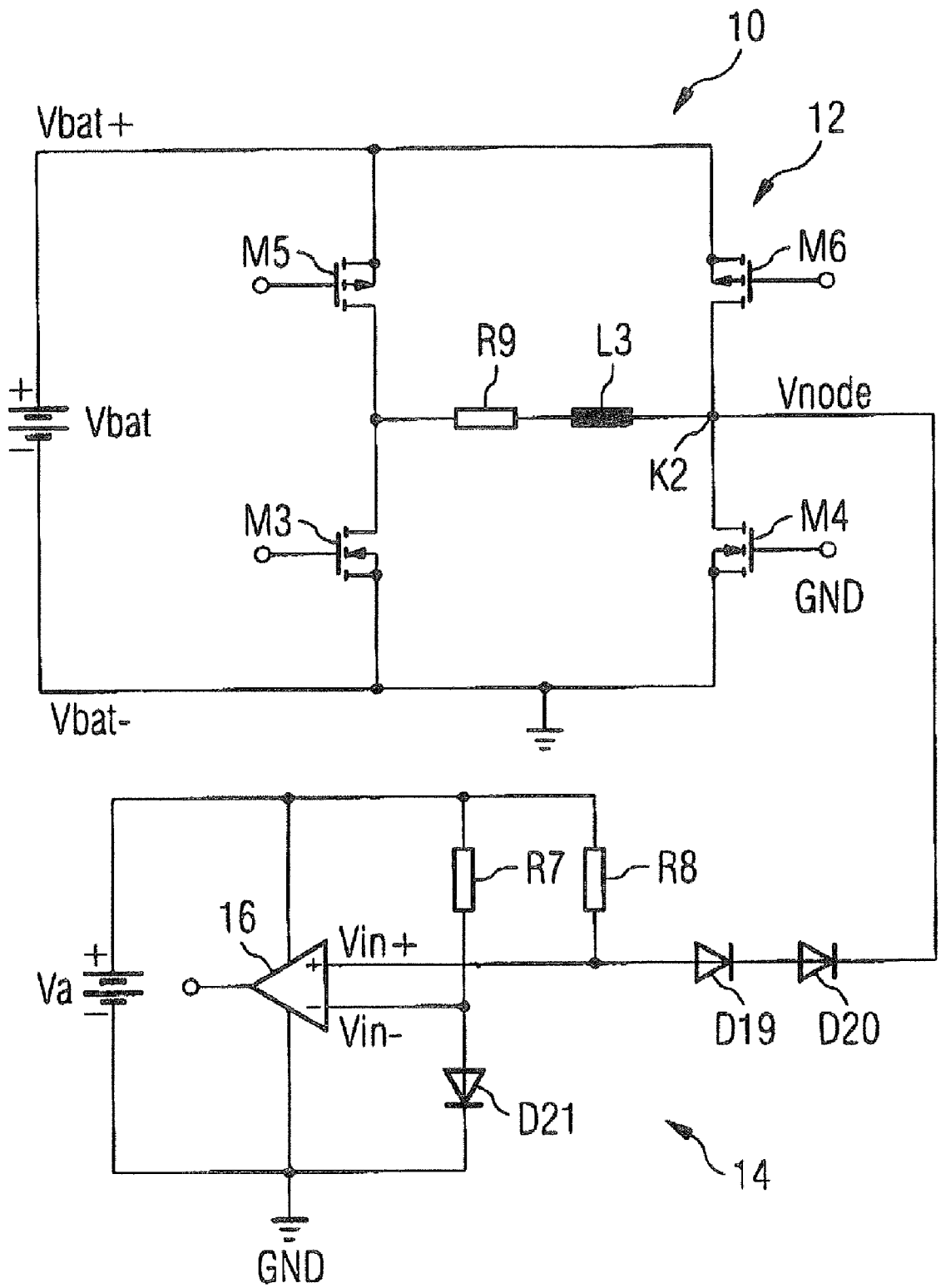
FIG. 1 shows a circuit arrangement having an output stage for switching an inductive load.

FIG. 1 shows a circuit arrangement 10 that includes an output stage 12 for switching an inductive load L3 by means of a switching transistor arrangement embodied here as what is termed a full bridge consisting of four switching transistors M3 to M6.

Further parts of the circuit arrangement 10 which is, for example, a control device for the internal combustion engine of a motor vehicle, are not shown in FIG. 1 because that is not necessary for understanding the present invention. What is in particular not shown is, for example, a circuitry part that supplies the control signals necessary for controlling the switching transistors M3 to M6.

The resistor R9 drawn in FIG. 1 in series with the inductive load L3 is intended to symbolize the in practice always present ohmic-resistance component of the load impedance.

By means of the switching transistors M3 to M6 the inductive load L3 can in a manner known per se be supplied with current from a supply voltage source Vbat, moreover optionally in either direction. If, for example, the transistors M5 and M4 are turned on, then the load current shown in FIG. 1 will flow "from left to right", whereas a load current can be caused to flow "from right to left" by turning on the transistors M5 and M3.

Proceeding from a condition in which a load current is flowing owing to the conducting condition of two transistors, the load current can be switched off by turning off at least one of said two transistors.

If, for example, proceeding from a conducting condition of the transistors M6 and M3 said transistors are turned off, then the load current flowing through L3 will not come to an abrupt halt because a freewheeling path via which the load current can continue to flow (flow back into the supply Vbat) will be formed by means of what are termed the parasitic drain-source diodes of the transistors M4 and M5 previously already turned off. At a circuit node K2 connected to a load terminal there will in that freewheeling phase be a potential below the negative supply potential Vbat–(=electric ground GND).

A potential Vnode of said type at the circuit node K2 lying outside the potential range [Vbat–, Vbat+] defined by the two supply potentials Vbat+ and Vbat– will in the case of the circuitry concept shown (full bridge) accordingly occur even during normal operation, but may in certain circumstances impair the functioning of other circuitry parts (not shown here) of the circuit arrangement 10 or cause malfunctions there. That is because the circuit arrangement 10 is embodied as an integrated circuit (in this case: ASIC) and the circuit node K2 is hence physically close to adjacent semiconductor regions of the same substrate so that the potential Vnode can influence said regions. What is principally to be considered in practice is an "indirect" impairment of physically adjacent regions whereby a parasitic effect (for example a parasitic npn bipolar transistor) is produced or brought to bear owing to a specific potential Vnode (for example at least one diode voltage "below ground") and so can influence adjacent regions of the same circuit arrangement.

Thus if faults occur while the circuit arrangement 10 is operating, said potential Vnode lying outside the supply potential range can be considered to be a possible cause or a condition giving rise to the fault. So information that will be useful in diagnosing or analyzing such faults is whether an "unusual" potential Vnode (one lying outside the supply potential range) of such kind was present or not at the circuit node K2 when the fault occurred.

An advantageous feature of the circuit arrangement 10 shown is that the instance in which the potential Vnode at the circuit node K2 of the output stage 12 lies outside the potential range [Vbat–, Vbat+] defined by the two supply potentials Vbat+ and Vbat– will be registered by a registering circuit 14 so it can be taken into account in fault diagnosing or analyzing.

A very broadly non-essential feature of the registering circuit 14, though one provided for in the example illustrated, is that it will detect only the instance in which the potential Vnode drops below the ground Vbat or GND. It would alternatively or additionally also be possible to provide registering of the instance in which the potential Vnode rises above the positive supply potential Vbat+.

A further, generally non-essential feature, though one that is provided for in the registering device 14 shown, is that the device will not respond immediately after the potential Vnode drops below the ground GND but only when the potential Vnode has dropped below the ground GND by a predefined minimum extent.

The registering circuit 14 operates as follows:

A comparator 16 fed from an auxiliary power source Va with a positive auxiliary potential and a negative auxiliary potential (which is connected to ground GND) compares two input potentials Vin+ and Vin− and supplies an output signal Vout corresponding to the comparison result. Said comparator output signal Vout is fed to a diagnostic device (not shown) for being taken into account in the diagnosing of faults in the functioning of the circuit arrangement 10. The voltage of Va can be produced by means, for example, of a DC/DC converter from the supply Vbat.

The potential Vin+ is formed at a circuit node that is connected, on the one hand, via a resistor R8 to the positive auxiliary power potential and, on the other, via a series-connected arrangement of the diodes D19 and D20 to the circuit node K2.

The potential Vin− is produced at a circuit node that is connected, on the one hand, via a resistor R7 to the positive auxiliary power potential, with the resistance values of the resistors R7 and R8 being identical, and, on the other, via a diode D21 to the electric ground GND. Like the resistors R7 and R8, the diodes D19, D20, and D21 all have substantially identical electric properties (are in particular embodied identically).

Providing the "additional" diode (D19 or D20, depending on how it is viewed) in one input path of the comparator 16 as compared with the "singly" provided diode D21 in the other input path of the comparator 16 results in the feature already mentioned above according to which the comparator 16 will not respond until the potential Vnode is below the ground GND by at least one diode voltage.

That feature takes account of the fact that with the circuit arrangement 10 embodied here as a microelectronically integrated circuit the potential Vnode will only in that particular instance be able to have any significant impact on adjacent circuitry parts and hence on the faults diagnosed there.

Summarizing, providing the registering device 14 or the use of its output signal Vout can significantly improve the diagnosing or analyzing of faults that occur in other circuitry parts and are to be detected by diagnostic devices (not shown). Diagnostic devices of such kind can have been provided, for example, for registering the following instances of faults: A break in the line to the load, short-circuiting toward the positive supply, short-circuiting toward the negative supply etc.

At least the diodes D19 to D21, expediently even the entire registering circuit 14, as well as the output stage 12 are preferably embodied as partial regions of one and the same integrated circuit. What will in practice be a particularly advantageous embodiment can in that case be realized that consists in arranging said diodes D19 to D21 in the immediate physical vicinity of the circuit node K2 (or the transistor terminals, connected thereto, of the transistors M4 and M6) so that there is good thermal coupling between said directly mutually adjacent semiconductor regions. That is especially advantageous since the diode voltage that is decisive in terms of other circuit regions, capability of being influenced proceeding from the circuit node K2 depends not just on the fabrication technology (for example topologies, doping profiles etc.) but also on the temperature of the region concerned. Through the good thermal coupling that was mentioned it can be ensured that the diode voltages of the microelectronically embodied diodes D19 to D21 will always correspond to the (temperature-dependent) diode voltage in the region of the circuit node K2 or the transistors M4 and M6.

Figure 2:
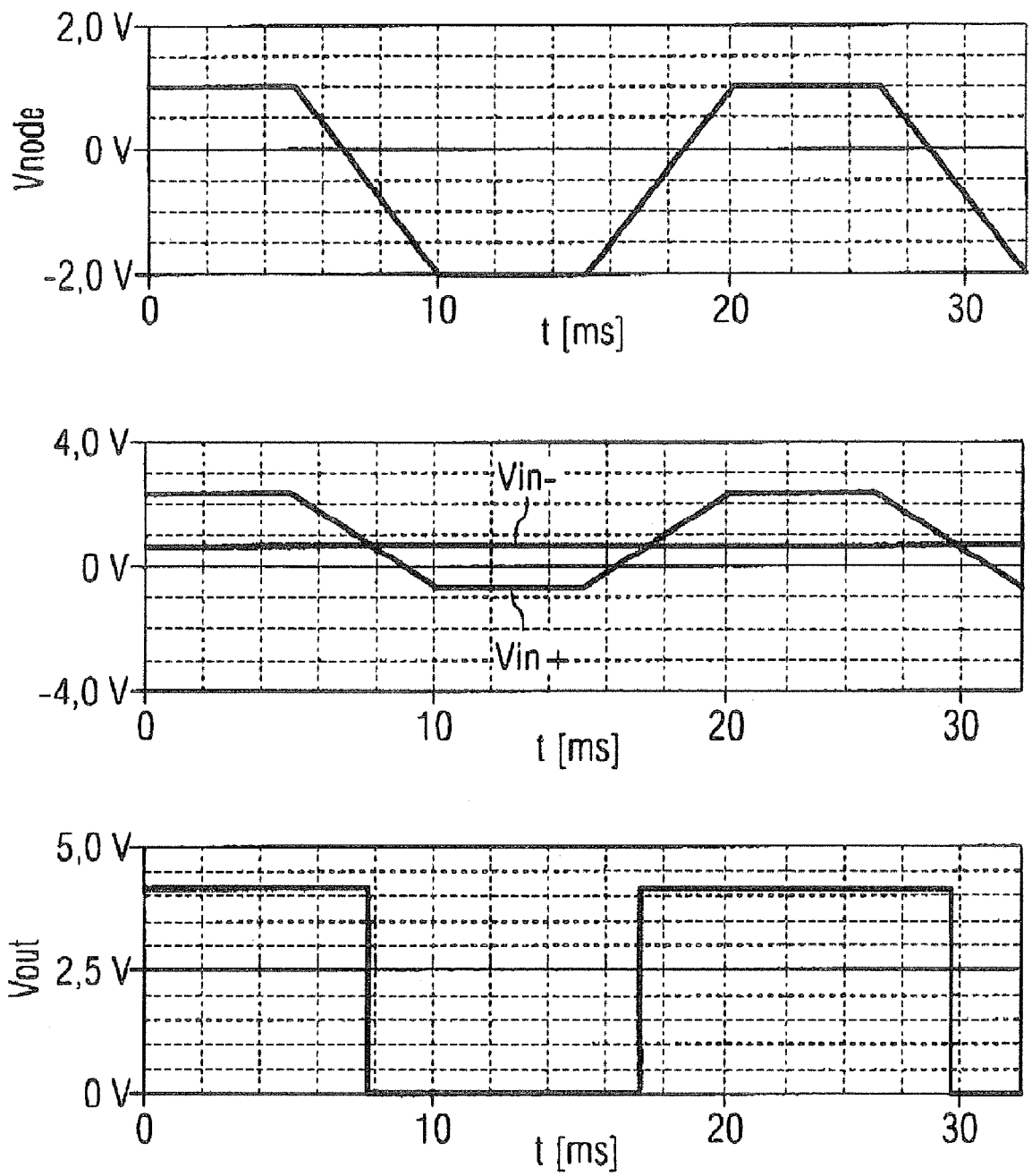
FIG. 2 shows time curves for different potentials or signals of the circuit arrangement shown in FIG. 1.

FIG. 2 illustrates how the registering circuit 14 operates with the aid of an exemplary time curve graph in which the circuit node potential Vnode, the comparator input potentials Vin+ and Vin−, and the comparator output signal Vout are each plotted against the time t.

It can be seen therefrom that a Vnode drop will result in a corresponding Vin+ drop, with Vin+ not reaching the (constant) potential Vin− until Vnode has dropped by a predefined extent below the electric ground (0 v). Said minimum extent, which results in a change in the comparator output signal Vout, is around −0.6 V in the example shown.

The output signal Vout will not change its signal status again until the potential Vnode has again risen above said threshold value. In the example described with reference to FIGS. 1 and 2 the "below-ground condition" will occur at the circuit node K2 even when the output stage 12 is working properly. It is insofar not to be deemed as such as a "fault instance". Registering it serves only to be able to better limit or determine the cause when faults occur elsewhere in the circuit arrangement 10. Described below with reference to FIG. 3 is an exemplary embodiment in which the occurrence of a "below-ground condition" is characteristic of a fault instance.

Figure 3:
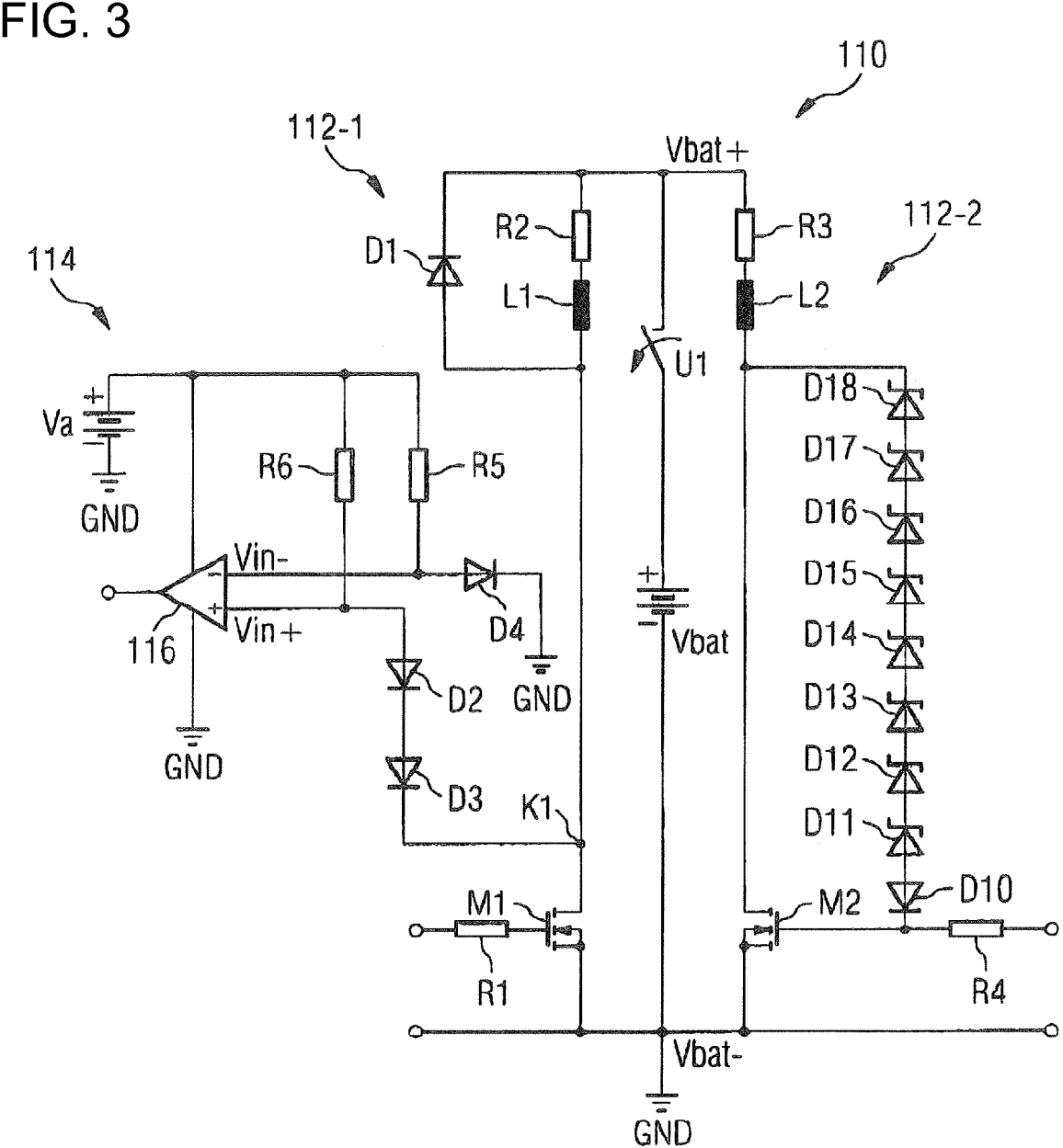
FIG. 3 shows a circuit arrangement according to a further embodiment variant.

FIG. 3 shows a circuit arrangement 110 that includes a first output stage 112-1 for switching an inductive load L1 and a second output stage 112-2 for switching a further inductive load L2. As with the first exemplary embodiment, the circuit arrangement 110 includes yet further circuitry parts which are not, though, shown in the figure for simplicity's sake.

Both output stages 112-1 and 112-2 are powered from a shared power supply Vbat or, as the case may be its potentials Vbat+ and Vbat−(=electric ground GND).

The resistors R2 and R3 arranged in series with the inductive loads L1 and L2 symbolize the respective load impedances' ohmic components that are present in practice.

In the case of the output stage 112-1 the load L1 is arranged in series with a switching transistor M1 between the two supply potentials Vbat+ and Vbat− so that current can be applied optionally to the load L1 by turning the switching transistor M1 on and off. Not shown is a drive circuit that applies a drive signal, required for driving the transistor M1, to a drive input of the output stage 112-1, which input is connected via a resistor Ri to the control terminal (gate) of the transistor M1.

When the transistor M1 is turned on, a load current flowing through the load L1 rises rapidly to at most a value determined by the supply voltage and the ohmic-resistance component in the load path. When the transistor M1 is turned off, in the example shown the load current continues flowing via a freewheeling circuit formed by a freewheeling diode D1 arranged in the manner shown parallel to the load L1.

In the case of the output stage 112-2 the load L2 is likewise arranged in series with a switching transistor M2 between the supply potentials Vbat+ and Vbat− of the power supply Vbat. A drive signal for turning the transistor M2 on and off is fed in at a drive input connected via a resistor R4 to the control terminal of the transistor M2. The circuitry part, provided for producing said drive signal, of the circuit arrangement 110 is not shown in the figure.

When the transistor M2 is turned on, a load current flowing through the load L2 rises rapidly. Unlike in the case of the output stage 112-1, the load current will, though, owing to the lack of a freewheeling circuit drop again comparatively rapidly when the transistor M2 of the output stage 112-2 is turned off. Associated therewith is a more or less considerable rise in the potential at a circuit node between L2 and M2. Between the source terminal and drain terminal of the transistor M2 there arises a large, what is termed turn-off voltage which, though, is limited to a specific size by a protective circuit between said circuit node and the control terminal (gate) of the transistor M2 (what is called "clamping" of the turn-off voltage, see, for example, the description of said protective mechanism in DE 198 41 227 C1).

The protective circuit consists in the exemplary embodiment shown of a blocking diode D10 connected in series with Zener diodes D11 to D18. The turn-off voltage is accordingly limited to a value corresponding substantially to the sum of the Zener voltages of the Zener diodes D11 to D. Let it be assumed that the transistor M1 is turned off and the transistor M2 is turned on. In that case a load current flows only via the load L2 and the turned-on transistor M2. If in that operating state a line break then occurs affecting the positive supply potential Vbat+, which is symbolized in the figure by opening of a switch U1, then the following will happen: The load current flowing at that moment through the load L2 will not be brought to an abrupt halt but initially continue flowing via a parasitic source-drain diode of the transistor M1 and diode 31. A potential below the negative supply potential Vbat− will therein arise at a circuit node K1 between the transistor M1 and the load L1.

A feature of the circuit arrangement 110 is that a registering device 114 for registering that very "below-ground condition" at the circuit node K1 is provided, with the structure and functioning mode of the registering device 14 corresponding to the corresponding structure or, as the case may be, corresponding functioning mode of the registering device 14 already described in detail above so that it is not necessary to describe the registering device 114.

Summarizing, providing the registering device 114 in the circuit arrangement 110 shown will make it easy to detect the fault instance of a line break on the supply side.

The invention claimed is:

1. A circuit arrangement, comprising:
   an output stage including at least one inductive load and a switching transistor arrangement for switching said at least one inductive load;
   a supply voltage having a first supply potential and a second supply potential for feeding the supply voltage to said output stage;
   a diode for producing a diode voltage; and
   a registering device for registering a particular instance when a potential at a specific circuit node of said output stage is outside a potential range by a predefined minimum amount defined by the first and second supply potentials beyond which amount there is a significant impact on other circuitry in the circuit arrangement, the minimum amount corresponding to the diode voltage resulting from a fabrication technology of said switching transistor.

2. The circuit arrangement according to claim 1, wherein said registering device is limited to registering a particular instance when the voltage potential at said specific circuit node is outside the potential range by the predefined minimum amount which is at least related to a diode voltage.

3. The circuit arrangement according to claim 1, wherein said registering device includes a comparator for comparing the voltage potential at said specific circuit node with one of the first and second supply potentials.

4. The circuit arrangement according to claim 1, wherein said switching transistor arrangement includes at least one DMOS transistor.

5. The circuit arrangement according to claim 1, wherein said circuit arrangement includes a diagnostic memory for storing a registering result.

6. A circuit arrangement, comprising:
   an output stage including at least one inductive load and a switching transistor arrangement for switching said at least one inductive load;
   a supply voltage having a first supply potential and a second supply potential for feeding the supply voltage to said output stage;
   a diode for producing a diode voltage; and
   a registering device for registering a particular instance when a potential at a specific circuit node of said output stage is outside a potential range by a predefined minimum amount defined by the first and second supply potentials, the minimum amount corresponding to the diode voltage resulting from a fabrication technology of said switching transistor arrangement.

* * * * *